United States Patent [19]
Puri et al.

[11] Patent Number: 5,176,725
[45] Date of Patent: Jan. 5, 1993

[54] MULTIPLE STAGE COUNTERCURRENT HOLLOW FIBER MEMBRANE MODULE

[75] Inventors: Pushpinder S. Puri, Macungie; Dilip G. Kalthod, Fleetwood, both of Pa.

[73] Assignee: Air Products and Chemicals, Inc., Allentown, Pa.

[21] Appl. No.: 736,197

[22] Filed: Jul. 26, 1991

[51] Int. Cl.⁵ .................... B01D 53/22; B01D 63/04
[52] U.S. Cl. .................... 55/158; 210/321.81; 210/321.9; 210/500.23
[58] Field of Search .......... 55/16, 158; 210/321.81, 210/321.9, 500.23

[56] References Cited

U.S. PATENT DOCUMENTS

| | | | |
|---|---|---|---|
| 3,228,877 | 1/1966 | Mahon | 210/22 |
| 3,422,008 | 1/1969 | McLain | 210/22 |
| 4,038,190 | 7/1977 | Baudet et al. | 210/321.81 |
| 4,045,851 | 9/1977 | Ashare et al. | 29/157 R |
| 4,208,902 | 6/1980 | Kim et al. | 55/158 X |
| 4,220,535 | 9/1980 | Leonard | 55/158 X |
| 4,237,596 | 12/1980 | Hughes et al. | 55/158 X |
| 4,351,092 | 9/1982 | Sebring | 28/100 |
| 4,352,736 | 10/1982 | Ukai et al. | 55/158 X |
| 4,676,808 | 6/1987 | Coplan | 55/158 |
| 4,707,267 | 11/1987 | Johnson | 55/158 X |
| 4,732,673 | 3/1988 | Dagard et al. | 55/158 X |
| 4,752,305 | 6/1988 | Johnson | 55/158 X |
| 4,865,736 | 9/1989 | Coplan | 55/158 X |
| 4,880,440 | 11/1989 | Perrin | 55/16 |
| 4,897,191 | 1/1990 | Langerak et al. | 55/158 X |
| 4,929,259 | 5/1990 | Caskey et al. | 55/158 |
| 4,961,760 | 10/1990 | Caskey et al. | 55/158 |
| 4,981,498 | 1/1991 | Bikson et al. | 55/158 X |
| 5,013,331 | 5/1991 | Edwards et al. | 55/16 |
| 5,013,437 | 5/1991 | Trimmer et al. | 55/16 X |
| 5,015,269 | 5/1991 | Garrett et al. | 55/158 X |
| 5,059,374 | 10/1991 | Krueger et al. | 55/158 X |

FOREIGN PATENT DOCUMENTS

| | | | |
|---|---|---|---|
| 1-056115 | 3/1989 | Japan | 55/158 |
| 1-056116 | 3/1989 | Japan | 55/158 |
| 1-063020 | 3/1989 | Japan | 55/158 |
| 1-281125 | 11/1989 | Japan | 55/158 |
| 1-281126 | 11/1989 | Japan | 55/158 |
| 2-059015 | 2/1990 | Japan | 55/16 |
| 2-059016 | 2/1990 | Japan | 55/158 |
| 3-086219 | 4/1991 | Japan | 55/158 |
| 256132 | 8/1989 | U.S.S.R. | |

OTHER PUBLICATIONS

C. R. Antonson, et al., "Analysis of Gas Separation by Permeation in Hollow Fibers," Ind. Eng. Chem., Proc. Des. Dev., vol. 16, No. 4, pp. 463-469, (1977).

*Primary Examiner*—Robert Spitzer
*Attorney, Agent, or Firm*—Mark L. Rodgers; William F. Marsh; James C. Simmons

[57] ABSTRACT

A hollow fiber separation module is provided having a single, elongated pressurizable shell and containing multiple separation stages by multiple sections of hollow fiber bundles contained within the shell, with the ends of each bundle section potted within a single tubesheet at each end of the elongated shell. The fibers within each section are aligned so that the permeate within the fiber bores passes along paths traveling generally from one tubesheet to the other and one or more impermeable barriers are provided within the shell to isolate each section and control the passage of feed gas along the shell side of each fiber bundle section in a flow path countercurrent to the passage of permeate in the bores of the fibers.

11 Claims, 3 Drawing Sheets

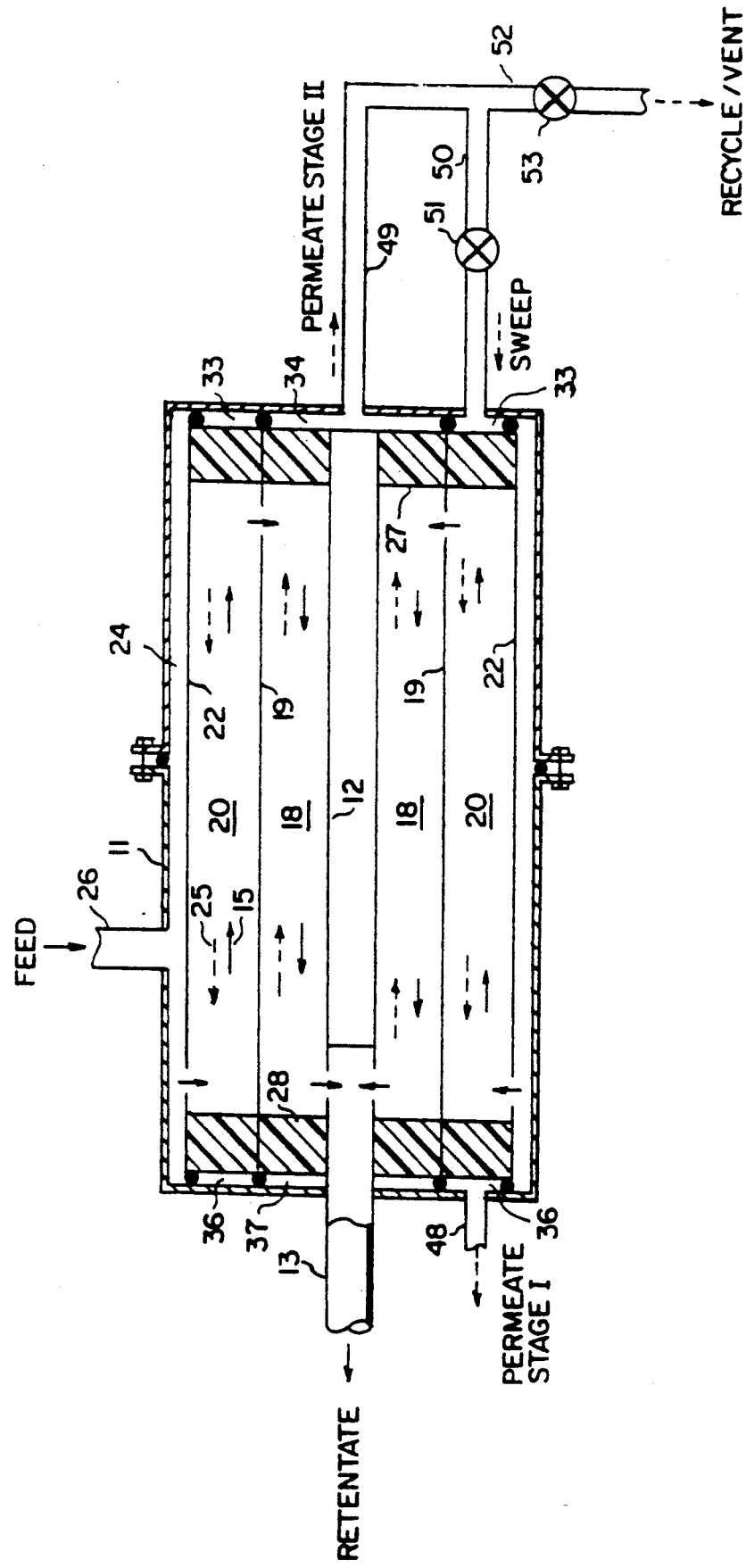

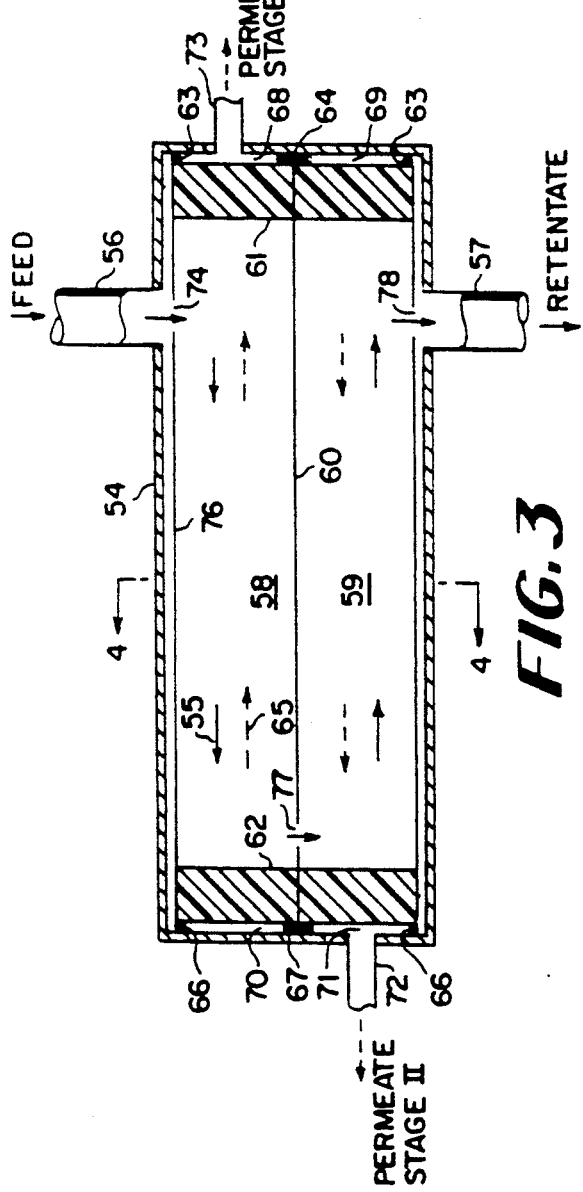
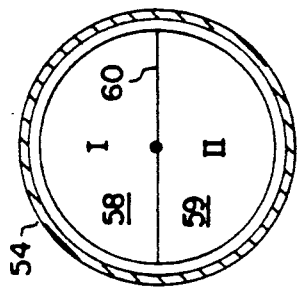
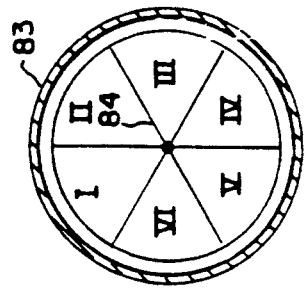
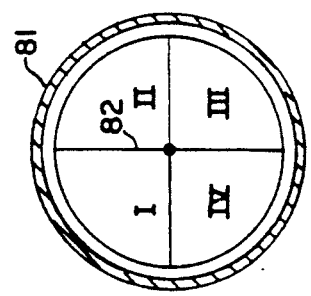
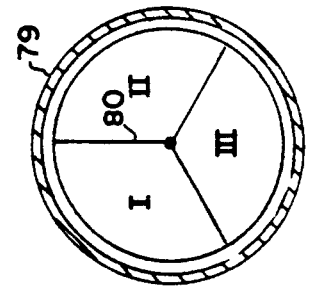

MULTIPLE STAGE COUNTERCURRENT HOLLOW FIBER MEMBRANE MODULE

FIELD OF THE INVENTION

This invention relates to a separation module using hollow fiber membranes. The module achieves countercurrent flow between a fluid feed mixture and feed components which permeate the membrane material. In another aspect, it relates to a countercurrent hollow fiber membrane module adapted to receive feed mixtures on the shell side of the fibers and pass permeate through the fiber bores.

BACKGROUND OF THE INVENTION

Semipermeable membranes in the form of hollow fibers have been used to separate components in fluid mixtures for many years. Hollow fibers, which can be spun from a wide variety of materials which have suitable membrane separation properties, provide high surface area for contact with the fluid mixture from which it is desired to separate certain components, some of which will pass through the membrane material faster than other components. This enables the recovery of such faster permeating components or the enhancement of the purity of the fluid in a slower permeating component, or both.

Large numbers of hollow fibers of similar length are generally grouped together in a pressurizable shell or housing in which opposite ends of the fibers are potted and sealed in a material which serves to form a tubesheet at each end, similar in fashion to a shell and tube heat exchanger. The potting material is cut to open the bores of the fibers which pass through it. The volume within the shell which has access to the exteriors of the fibers (shell side) is effectively sealed by the tubesheets and other peripheral sealing devices from the volumes within the shell which are in open communication with the fiber bores.

Such devices can be used to separate liquid mixtures or to separate vapors or gases from liquids, but have found particular utility in the separation of gases, such as in air separation to purify nitrogen.

A number of methods for making bundles of hollow fibers suitable for fabrication of membrane modules are taught in the patent literature. For example, U.S. Pat. No. 3,228,877, Mahon (1966), describes the concept of using hollow fibers in a gas separating apparatus. In a subsequent development, U.S. Pat. No. 3,422,008, McLain (1969) discloses a method to wind hollow fibers spirally around a cylinder core. This permits the winding of hollow fibers to form a bundle shape such that the bundle is in an annular form with narrow flow channels which improve fluid flow distribution on the shell side of the fibers. A method to make a coreless annular array of helically wound fibers is described in U.S. Pat. No. 4,045,851 to Ashare, et al. (1977), and another method for making coreless hollow fiber membrane bundles is described in U.S. Pat. No. 4,351,092, Sebring, et al. (1982) wherein the fibers are interlaced with one another in left-hand and right-hand helices at angles to the common axis of rotation of the rotary members which form the fiber bundle. The foregoing disclosures describe modules which are typical and in which the fluid mixture to be separated is exposed to substantially all of the fibers at one time. Modules have been developed, however, in which the fiber bundles are partitioned into sections in order to manipulate the flow distribution of the feed material or of the permeate.

U.S. Pat. No. 4,676,808, Coplan (1987) describes a hollow fiber membrane module in which the potted ends of the fibers are cut differently at each end so that fibers opening at one end are closed at the other, and visa versa. Two concentric fiber bundle sections are thus formed in one module to simulate two modules arranged in series. The arrangement is said to form two permeates of different compositions since each bundle section is encountered by the feed gas as it flows radially from an outer cylindrical space to a central axial core from which it exits. The feed gas, therefore, flows perpendicularly to the flow of permeate gas within the fiber bores.

Russian patent SU256,132 (1987) discloses concentric baffling in a hollow fiber bundle of a separation module in order to channel feed mixtures back and forth through the shell side of the bundle. One permeate is taken from one end of the fiber bundle so that the feed flows cocurrently with part of the permeate and countercurrently to part of it. Reversing the feed does not change this relationship. The separation module cannot function like two modules in series since only one permeate is produced.

U.S. Pat. No. 4,880,440, Perrin (1989) discloses hollow fiber membrane separation modules having two different types of fiber membrane possessing different fluid component separation characteristics for production of two permeate streams differing in composition and one raffinate stream from a feed mixture. The two types of fiber are wound helically on a mandrel, either intertwined or in alternating layers, but spaced so that only one of each fiber course extends to one end of the fiber bundle. When each end of the bundle is potted in a tubesheet and cut, only the type of fiber which extends to that end of the bundle is severed and opened for permeate to exit the bores of the fibers. Although feed is shown entering one end of the entire bundle on the shell side and raffinate leaving at the opposite end, the permeate streams necessarily flow in opposite directions. Consequently, countercurrent flow with the feed is achieved, if at all, only with respect to one of the permeate streams.

U.S. Pat. No. 4,929,259, Caskey, et al. (1990) discusses the advantage of countercurrent flow in hollow fiber membrane modules where the feed is to the bore side of the fibers. Concentric baffles, or a helical baffle, within the fiber bundle and on the outside toward the casing, are arranged to channel permeate flow countercurrently to the passage of feed fluid through the bores of the fibers. Sweep gas can be introduced through the core of the module to pass on the shell side of the fibers and enhance countercurrent flow of the permeate. No disclosure is included for operation of the module with feed to the shell side of the bundle, nor would reversing flow through the apparatus disclosed produce permeate streams differing in composition.

In hollow fiber membrane modules developed for air separation, feed gas channeling and deviations from countercurrent flow patterns can cause significantly lower performance. In modules operated with the feed through the bores of the fibers, uniformity of feed flow distribution and a good approach to countercurrent flow are easily achieved. A discussion of the effects of flow patterns is given by Antonson et al., "Analysis of Gas Separation by Permeation in Hollow Fibers", Ind.

Eng. Chem. Process Des. Dev., Vol. 16, No. 4 pp 463-9(1977).

Hollow fiber membrane modules can in general be made by using either dense, asymmetric or thin film composite fibers. Brief descriptions of the three kinds of fibers are given below:

(a) Dense fibers have walls of uniform density and essentially zero porosity. They are usually made by melt spinning.

(b) Asymmetric fibers have a thin dense skin (which constitutes the separating layer) imbedded in a wall with a gradation of porosity through its thickness. They are made by phase inversion processes.

(c) Thin film composite fibers have a single or multiple coating of one or more polymers applied to the surface of a porous substrate fiber that provides a support for the coating(s).

Whereas dense and asymmetric fibers are usually made of a single polymeric material thin film composites are generally made by applying a coating different from the material of the substrate, this results in weaker adhesion between the separating layer and the substrate. In this case the probability of rupture is high when feed pressure is applied to the side opposite to the coating. Hence for thin film composite fibers coated on the exterior and for asymmetric membranes with the separating layer on the exterior shell-side fide is desirable.

Non-uniformity of feed flow distribution and deviations from countercurrent flow are valid concerns in modules adapted for shell-side feed. While many problems in gas separation efficiency can be appropriately addressed by simply using multiple modules connected in series, this is a costly solution because of the increased number of pressure vessels which are required.

SUMMARY OF INVENTION

According to our invention, a hollow fiber separation module is provided in which countercurrent flow of feed and permeate streams are achieved and the feed is fed to the shell-side of the fibers. Because of the construction of the module, uniformity of feed distribution can be readily achieved and permeates of two or more compositions are produced as would be the case in the use of modules arranged in series, but without the duplication of pressurizable housings for different modules.

The hollow fiber separation module of our invention uses one pressurizable shell. Within that shell is an elongated bundle of hollow fibers, the fibers being formed from semipermeable membrane material which is capable of separating components from a fluid mixture. The fibers are aligned generally along paths running from one end of the bundle to the other end, and each of the ends of the fibers are collectively embedded in potting compounds which form tubesheets and thereby seal the bores of the fibers from the fiber exteriors which lie within the shell, but between the tubesheets. At least one impermeable wall member extends longitudinally through the fiber bundle and partitions the bundle between the tubesheets into at least two sections, so that each fiber which lies between the tubesheets also lies completely within one or the other of the sections that are partitioned by the wall member. The module also includes means for introducing a fluid feed mixture into a first section of the bundle on the shell side of the fibers and at a point which is adjacent to a first tubesheet, and means for passing fluid mixture retentate from that first bundle section at a point adjacent to the second tubesheet, passing into the second section of the bundle adjacent to the second tubesheet and on the shell side of the fibers. Means are also provided for removing retentate (raffinate) from said second section of bundles at a point adjacent to the first tubesheet and also means for removing retentate from the shell. The module further includes sealing means which cooperate with the two tubesheets for sealing the bores of the fibers of each section from the bores of the fibers in any other section and defining discrete collection zones for the permeate from the bores of the fibers of each section. Means are also provided for withdrawing a first permeate from the collection zone of the first section adjacent to said first tubesheet and other means for withdrawing a second permeate from a collection zone of the second section which is adjacent to the second tubesheet.

In a preferred embodiment of our invention, the two sections of hollow fiber bundles in the module are annular in cross section and concentrically arranged and separated by an impermeable barrier of flexible material. The hollow fibers contained within each of the sections are uniformaly packed and potted in the same tubesheets. The feed mixture flows through the two sections in series on the shell-side of the fibers and each section is properly dimensioned in cross-section with respect to the flow rate so that uniformity of flow is achieved with a uniform distribution of feed across the fiber bundle. Countercurrent flow of the feed material and of the permeate is achieved in each section of the module.

Flexibility of operation which is available only by the use of two or more modules connected in series can be achieved with the single module of our invention. Cost benefits in construction and also in piping provide a distinct advantage of the single module of our invention over multiple modules connected in series.

IN THE DRAWINGS

FIG. 2 is also a schematic cross section of the module of our invention as shown in FIG. 1 but with the feed reversed, entering at the periphery of the module and exiting at the core.

FIG. 3 is a schematic cross section of another embodiment of our invention in which the partitioning wall member lies transversely through the shell along the axis of the module.

FIG. 4 is a sectional view of the module of FIG. 3 illustrating the partitioning of the module into Sections I and II.

FIGS. 5, 6 and 7 are also sectional views of modules in the same manner as FIG. 4 showing other possible arrangements of the partitioning wall member to increase the number of partitioned sections within the module to 3, 4 and 6, respectively.

DETAILED DESCRIPTION OF THE INVENTION

Figure 1:
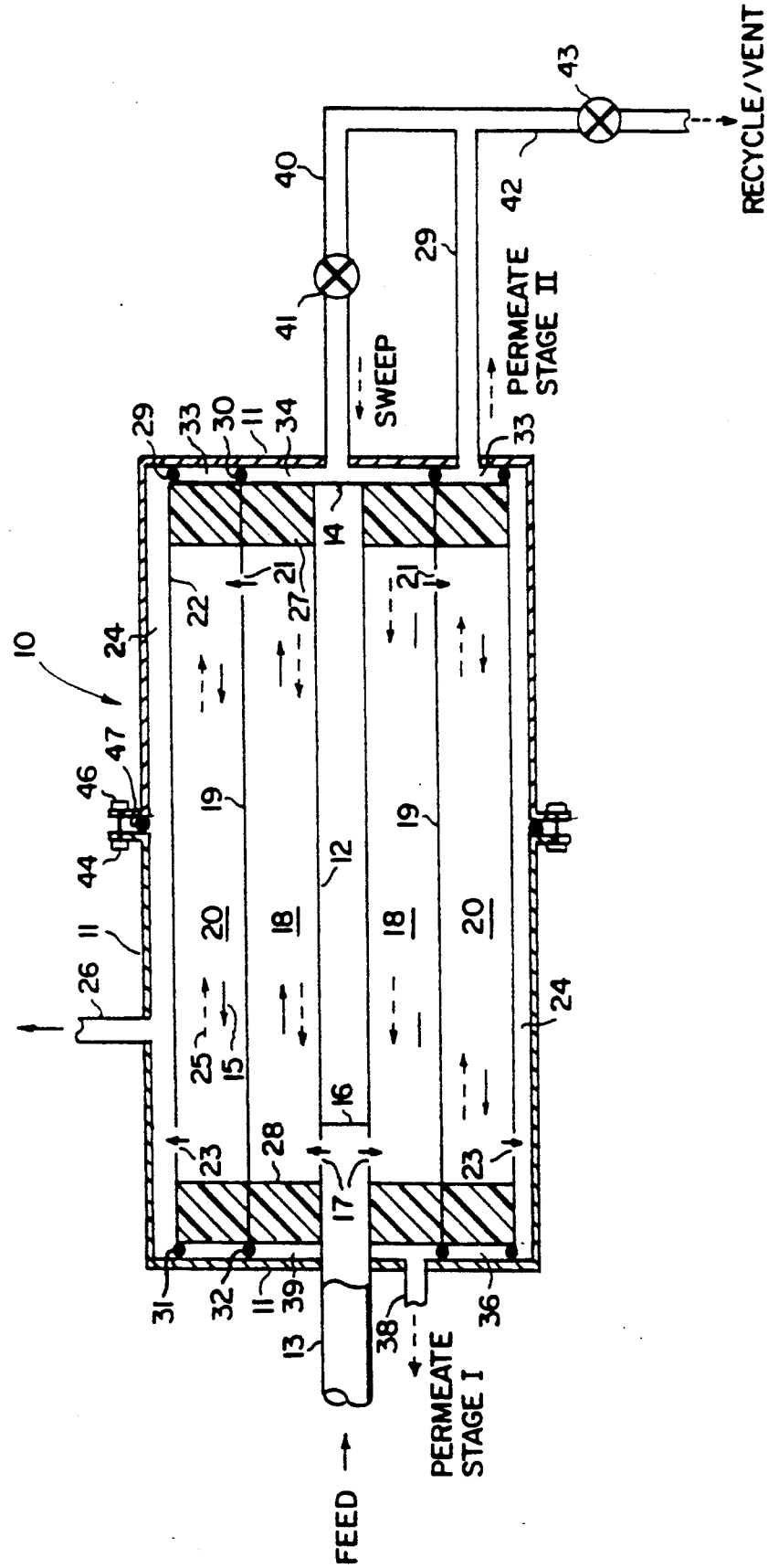
FIG. 1 is a schematic cross section of the module of the invention in which feed is passed to a central axial core and removed as retentate from the periphery of the module.

The hollow fiber membrane module of our invention includes at least two parallel sections of the fiber bundle, each section containing uniformly packed hollow fibers past which the feed material flows on the exterior of the fibers and sequentially in series through the sections. Each section is dimensioned so that its cross section is sufficiently small that uniform distribution of the feed is achieved as the feed mixture passes along the length of the fibers in each bundle section. A countercurrent flow pattern of the feed and permeate is achieved in each module section. The design of the module can best be understood by referring to FIG. 1 which represents schematically a preferred embodiment in which the fiber bundle sections are arranged concentrically in an annular form around an axial core and within the pressurizable module shell.

Referring to FIG. 1 there is shown a module 10 having an outer shell 11 of generally elongated cylindrical configuration and an axially positioned mandrel 12 which serves as a support for the fiber bundles which are not shown in FIG. 1 but whose positioning will be described. Mandrel 12 can be a hollow tube or pipe through which feed mixture to be separated flows entering the module through conduit 13. If mandrel 12 is a hollow pipe, it is sealed at a suitable point such as by plug 14 or 16 so that the feed material is forced to enter the fiber bundle through openings 17.

An elongated fiber bundle 18 is formed around mandrel 12 and an impermeable sheath or sleeve 19 surrounds the bundle 18 and effectively partitions the volume within the shell 11 occupied by fiber bundle 18 from the volume within the shell which is occupied by fiber bundle 20, which is placed around and is concentric with bundle 18. The thickness of each bundle 18 and 20 depends upon on the desired cross section of the fiber bundles to accommodate an even distribution of feed flowing through each of the sections. The individual fibers in bundles 18 and 20 can lie parallel to the axis of the module along which mandrel 12 lies, or the fibers can be wound helically or be interlaced, but they should be aligned for close and even packing and run generally along paths which extend from one end of each bundle to the other, so that passage of permeate within the bores of the fibers moves continuously in one direction toward one end of the fiber bundle or in the opposite direction as shown by broken line arrows 25, these directions being countercurrent to the flow of the feed mixture which is represented by the solid line arrows 15 shown within the module in FIG. 1. The impermeable sheath or sleeve which serves as a wall member between the concentric annular bundle sections 18 and 20 contains passages 21 which permit feed material to flow from the section of the module containing fiber bundle 18 to the section of the module containing fiber bundle 20. Sheath 19 is preferably flexible to accommodate slight movements within the fiber bundles which are caused by changes of pressurization within the module. The sheath can be formed from an impermeable plastic, such as polyethylene or polypropylene, or a thin metal.

Preferably, another sheath 22 is placed around the outside of fiber bundle 20. If sheath 22 is used then passages 23 are provided in the sheath in order to permit retentate to exit from the volume of the module which contains fiber bundle 20. Retentate then collects within space 24 which lies between the outside of fiber bundle 20 and the shell 11 of the module and this retentate is removed from the module by way of conduit 26 which communicates with space 24. Sheath 22 can be a wall of a plastic cartridge into which the fiber bundles are inserted and can be formed of material similar to that of sheath 19. One function of sheath 22 is to assist retaining the fibers of bundle 20 in place through repeated pressurizations and depressurizations as the module is used in its separation function. This cartridge does not have to be a pressurizable container, since there is very little pressure difference between the volume occupied by bundle 20 and space 24.

The ends of the fibers for both bundles 18 and 20 are potted in tubesheets 27 and 28. Tubesheet 27 serves the fibers of both bundles 18 and 20 as does tubesheet 28 which is positioned on the opposite end of the fiber bundles. Potting resins for this function are well known in the art and are generally made from either an epoxy or polyurethane resin. When the potted fiber bundles are fixed in place in a plastic cartridge and supported on the axial mandrel, the outer surfaces of tubesheets 27 and 28 are trimmed in a known manner to open up the ends of the fibers of bundles 18 and 20. Tubesheets 27 and 28 effectively seal off the bores of the fibers from their exteriors which lie between the tubesheets. Assisting in this sealing of the space between the tubesheets are O-rings 29 and 30, positioned concentrically between the end of casing 11 and tubesheet 27, and O-rings 31 and 32 positioned concentrically between the other end of shell 11 and tubesheet 28. O-rings 29 and 30 are positioned to define and seal off annular collection zone 33 which is adjacent tubesheet 27 and in open communication with the bores of the fibers of bundle 20. Similarly, O-ring 30 cooperating with the end of shell 11 and tubesheet 27 defines and seals off volume 34, which is adjacent tubesheet 27 and in open communication with the bores of the fibers of bundle 18.

In like manner, O-rings 31 and 32 cooperate with tubesheet 28 and the end of shell 11 to seal off and define an annular zone 36. In this embodiment, zone 36 serves no function except to seal off the ends of the fibers of bundle 20, which pass through tubesheet 28. Other means for sealing the ends of these fibers can be employed. O-ring 32 cooperates with tubesheet 28 and the end of shell 11 to form a collection zone 37, which is in open communication with the bores of the fibers of bundle 18. Permeate passing from the bores of the fibers of bundle 18 into collection zone 37 can be removed from the shell by conduit 38, which is connected to communicate with zone 37. Likewise, permeate exiting from the bores of the fibers of bundle 20 into zone 33 can be removed by conduit 39 which communicates with zone 33. Conduit 40 is provided connected to permeate exit conduit 29 with valve 41 to communicate with volume 34 in order to permit part of the permeate exiting from the fiber bundle 20 to be used as a sweep gas through the bores of fiber bundle 18. The remainder of the permeate from fiber bundle 20 can be withdrawn by way of conduit 42 through valve 43. This permeate can, as subsequently described, be recycled to feed, vented, or collected for some other purpose. In FIG. 1, permeate flow direction is indicated by broken line arrows, e.g. arrow 25, and feed or feed retentate flow direction is indicated by solid line arrows, e.g. arrow 15. It is convenient for shell 11 to be built in two halves for positioning of the fiber bundles. These halves, as shown in FIG. 1, can be joined together securely by bolts passing through flanges 44 and 46 with the connection sealed by gasket 47. Alternative structures, such as flanged end sections for shell 11, can be employed as well.

Having thus described the apparatus of FIG. 1, its operation to separate air for the production of nitrogen will be described. Feed air is passed through conduit 13 and enters the fiber bundle 18 through ports 17 which are positioned adjacent tubesheet 28. These openings 17 which are positioned immediately downstream of the potting resin boundary of tubesheet 28, distribute the feed air radially through the thickness of bundle 18. The feed gas travels lengthwise along the line of the axis of the module, through fiber bundle 18, as indicated by the solid line arrows in FIG. 1 and passes into the volume occupied fiber bundle 20, through passages 21 which are positioned immediately adjacent tubesheet 27 at the opposite end of bundle 18 where the feed enters. This feed gas material, which is the retentate from fiber bundle 18, becomes the feed gas for bundle 20. Thus, the operation of the separation of gas through fiber bundle 18 provides a stage I separation which is followed immediately by stage II separation, which occurs in fiber bundle 20. This retentate from stage I travels along the axial direction of bundle 20 as shown by the solid line arrows of FIG. 1, moving in the direction opposite to that of the flow of feed gas in stage I. The retentate from fiber bundle 20 or stage II exits from the bundle through passages 23 in sheath or cartridge 22 and leaves the module through conduit 26 which communicates with volume 24 within shell 11.

The permeate gas of stage I or bundle 18 travels, as shown by the broken line arrows, countercurrently to the flow of feed gas and exits from the bores of the fibers in bundle 18 into collection zone 39 and then is removed from the module by way of conduit 38. The permeate of stage II or of fiber bundle 20 passes countercurrently to the flow of feed gas and exits from the bores of the fibers of bundle 20 into zone 33 and then into conduit 29, through which it is removed from the module. The module design and construction, therefore, permits the effective separation of feed gas, retentate, and permeates from two separate stages of the process which is practiced with the module. Although a two stage module is described in FIG. 1 using a single cylindrical wall member between the fiber bundles 18 and 20, this design can be extended through other annular sections arranged radially outwardly from bundle 20, and being axially concentric therewith. All of the fiber bundles or fiber bundle sections which are developed in this manner can be potted in the same tubesheets, using one tubesheet for each end of the collective fiber bundles.

FIG. 2 shows the same module structure as FIG. 1, except for the external permeate conduits as will be described, but the operation of FIG. 2 is such that feed gas is fed to the peripheral 24 volume of shell 11 through conduit 26 and exits from shell 11 through axial conduit 13 as retentate. In FIG. 2 the direction of the arrows internally of the module are reversed from that of FIG. 1, showing the reverse flows of feed gas and permeate through the module. The result of this flow reversal is to make the separation occurring within fiber bundle 20 the first stage or stage I of the operation and the separation occurring within bundle 18 stage II of the separation. Permeate from stage I exiting from the bores of fiber bundle 20 into collection zone 36 adjacent tubesheet 28, is removed from the module by way of conduit 48 which communicates with zone 36. Volume 37 which is also adjacent tubesheet 28 is effectively sealed and does not communicate with any other volume of the module so that other sealing means can be employed to close the ends of the fiber bundle 18 which pass through tubesheet 28.

At the opposite end of the module adjacent tubesheet 27, permeate from fiber bundle 18 exits the bores of the fibers into zone 34 which communicates with exit conduit 49. Fiber bundle 18, therefore, provides stage II of the separation so that the stage II permeate is removed through conduit 49, while a separate stage I permeate is removed through conduit 48.

A portion of the stage II permeate can be used as a sweep gas for passing through the bores of fiber bundle 20 by passing it through conduit 50 and valve 51 into volume 33 which communicates with the bores of fiber bundle 20. The remainder of stage II permeate can be withdrawn by conduit 52 through valve 53 and passed as a recycle to the feed gas or vented or used for some other purpose. In the operation of the module of FIG. 2, therefore, a feed air would enter the module through conduit 26 and pass through passages in sheath 22 into the fiber bundle 20 immediately adjacent tubesheet 28, passing axially along the length of bundle 20. The retentate from this stage I passes into fiber bundle 18 through passages in sheath 19 adjacent tubesheet 27. This feed gas then passes axially along the length of bundle 18 and is removed through passages in mandrel 12 adjacent tubesheet 28 and exits through conduit 13. It can be seen that although the flow of feed gas is reversed from that shown in FIG. 1, the module is readily adaptable for removal of permeates from both stage I and stage II of the separation in such a manner that countercurrent flows of feed gas on the shell side of the fibers and permeate in the bores of the fibers is insured.

Although concentric annular fiber bundles are preferred as shown in FIGS. 1 and 2, FIG. 3 illustrates an alternative embodiment in which the wall barrier separating the fiber bundles into two separate sections is accomplished by a single flat wall member which passes from one side of the shell to the other through the axis of the module. An end view of this separating barrier is further illustrated in FIG. 4 as a sectional view along lines 4—4 in FIG. 3. In FIG. 3 shell 54 of the module illustrated has a feed conduit 56 for introduction of feed gas and conduit 57 for removal of retentate. Shell 54 houses fiber bundles 58 and 59 which are separated by barrier member 60, which is an impermeable member of material similar to the sheaths of FIGS. 1 and 2. Shell 54 and fiber bundles 58 and 59 separated by barrier 60 are also illustrated in FIG. 4 in which there are formed sections I and II, which provides the two separating stages of the module. The fiber ends of both bundles 58 and 59 are imbedded in tubesheet 61 at one end and in tubesheet 62 at the opposite end. O-rings 63 and 66 between tubesheets 61 and 62, respectively, and the ends of shell 54, together with gaskets 64 and 67, which parallel barrier 60 between tubesheets 61 and 62, respectively, and the ends of shell 54, define zones 68 and 69 which communicate with the bores of the fibers of bundle 58 and 59, respectively, as they pass through tubesheet 61 and zones 70 and 71 which communicate with the bores of fibers in bundles 58 and 59, respectively, at their opposite ends where they pass through tubesheet 62. Conduit 73 communicating with zone 68 and conduit 72 communicating with zone 71 are used for removal of the permeates from the fiber bundles 58 and 59, respectively.

Describing the operation of the module of FIG. 3, feed gas enters the module through conduit 56 and passes through openings 74 distributed in sheath 76 adjacent to tubesheet 61 into the volume of the module which is occupied by fiber bundle 58. The feed gas passes axially through fiber bundle 58 toward tubesheet 62 as indicated by solid line arrow 55 and then passes through openings in barrier 60 by way of passages 77 into the volume of shell 54 occupied by bundle 59. From there the retentate from bundle 58, which is the feed gas for bundle 59, passes toward tubesheet 61 and exits this volume through passages 78 which are distributed in the sheath 76 communicating with the volume of the module which is occupied by bundle 59. Stage I of the separation occurs in bundle 58 and stage II of the separation occurs in bundle 59. Permeate of stage I passes through the bores of the fibers of bundle 58 as indicated by broken line arrow 65 and thence into volume 68 and is removed by conduit 73. Permeate from stage II passes into volume 71 from the bores of the bundle 59 and is removed by conduit 72.

The fibers are laid down so that they run generally parallel to the axis of shell 54 filling the volumes illustrated for sections I and II (FIG. 4). All of the fibers of bundle 58 are completely contained within section I and all of the fibers of bundle 59 are completely contained within section II. The fibers follow a generally parallel path so that as permeate passes through the bores of the fibers in bundle 58, it moves toward tubesheet 61 and as permeate passes through the bores of fiber bundle 59 it moves toward tubesheet 62. In this manner countercurrent flows of the permeates and of the feed gas is assured. In FIG. 3 the solid line arrows illustrate the direction of flow of the feed gas and feed retentate and the broken line arrows indicate the direction of flow of the permeates.

While two sections are shown in FIGS. 3 and 4, multiple sections can be provided by providing barriers functioning in a manner similar to that of barrier 60 in FIGS. 3 and 4, but having different configurations as illustrated in FIGS. 5, 6 and 7 which are sectional end views of alternate embodiments. In FIG. 5, the volume contained within shell 79 is divided by a barrier 80 into sections I, II and III, while in FIG. 6 the volume contained within shell 81 is divided by barrier 82 into sections I, II, III, and IV. In a similar manner the volume of the shell 83 illustrated in FIG. 7 is divided by barrier 84 into six separate separating sections which can be used sequentially by providing suitable passages through the barrier walls adjacent the tubesheets from one section into the other. The fiber bundles are formed by laying down fibers in a generally parallel fashion looping back and forth within each section. The fibers are opened to communicate with collection zones after they have been potted into single tubesheets at each end of the module.

It will be apparent from the description given in regard to FIGS. 1 and 2 that the module of FIG. 3 as well as those of FIGS. 5-7 can be modified to include a provision for a sweep gas by taking a part of the permeate from stage II of the module and passing it into the zone 70 (FIG. 3) which communicates with the bores of the fibers of bundle 58.

The module of this invention can be used in a simple 2-stage separation with the recovery of two separate permeats and a retentate. Alternatively, the module can be operated in order to recycle part of the permeate from stage II to the feed. This reduces permeate back pressure build-up in the bores of the fibers of stage I. When this is done, it is desirable to recycle the permeate to the compressor inlet for the feed gas in order to avoid having to provide a separate compressor for the recycle line. In air separation, the relatively high nitrogen content of the stage II permeate allows an increase in module productivity when at least a portion of this stream is recycled to feed.

Still another mode of operation of the module is with the use of stage II permeate to sweep the bores of the stage I fiber bundle. This increases the efficiency of the module's performance. A preferred mode of operation is with the use of part of stage II permeate as recycle and part as a sweep gas to the bores of the fibers of stage I. The module design of this invention readily provides for accomplishing this result. The proportion of stage II permeate used as sweep, recycle and permeate vent is chosen to maximize productivity.

The module of this invention also can readily be adapted to an operation in which the two stages have fibers of different sizes or different separation characteristics. Preferably, the fiber size for stage I is chosen so that the permeate sweep from stage II does not cause excessive back pressure and in this case the bores of the fibers for stage I are slightly larger than the bores of the fibers for stage II. Operating in this fashion provides the advantage of enabling a higher packing density and higher area per unit volume of the module in stage II where the finer fiber is used. By using two different fiber sizes, optimum operation in each of the two stages of the module can be realized.

One advantage of the module of this invention over the use of separate modules in series, in addition to the economics of using only one pressure vessel, is that in the two stage module of our invention, the cross sections of the fiber bundles in each of the stages can be sized to provide a membrane area cross section area for optimum operation of the system. Although separate modules could also be sized differently, the economics of fabrication usually dictate that modules are made of identical sizes in order to keep manufacturing costs at a minimum.

Operating the two stage module with fiber membranes having different separation properties such as permeation and selectivity can be readily accomplished to satisfy a particular operating demand without altering the cost of module fabrication. For example, it is desirable at times to have a fiber exhibiting higher selectivity for a stage II operation in the separation of air. Use of fibers having higher selectivity in stage II provides a higher purity for the slower component in the retentate. The structural parameters of fiber size, fiber area and bundle cross section as well as fibers of different separation properties can be readily incorporated to optimize a separation process in the single two stage module without increasing overall manufacturing cost of the module.

As an alternative embodiment, the module is combined with a suitable vacuum-producing device, such as a steam or water ejector or vacuum pump, in order to reduce the pressure and draw a partial vacuum to the bore side of stage II of the module. Even moderate vacuums, for example about 5 psia, can provide significant increases in both productivity and recovery. Although this provision of means to provide vacuum to stage II of the module is most advantageous, both permeate streams can be provided with means for producing a vacuum within the fiber bores.

Still another variation of the module of our invention is to provide conduit means to pass a portion of the retentate from stage II of the module back to the bores of the fiber in stage II to provide a sweep gas. Using FIG. 3 to describe such an embodiment, conduit 57 would be connected through a passageway, not shown, to communicate with volume 69 adjacent tubesheet 61. This volume 69 communicates with the bores of the fibers in bundle 59 and a portion of the permeate from conduit 57 would sweep these bores toward the exit through tubesheet 62 into zone 71 with stage II permeate as it is removed through conduit 72. In combination with such an operation, a portion of the stage II permeate can be used to sweep the bores of the fiber bundle in stage I as illustrated in FIGS. 1 and 2 and also a portion of this permeate can be recycled to the compressor inlet of the feedstream. The module is, therefore, readily adaptable to provide a sweep gas to each of the fiber bundles on the bore side to improve the countercurrent flows of feed gas and permeate and also to recycle a portion of the stage II permeate to the feed. Proportions of these streams are readily chosen to maximize productivity and such an operation illustrates the versatility of the module of this invention.

The module is particularly valuable when employing hollow fibers which are thin film composite or asymmetric membrane structures. Such hollow fibers are well known and are available commercially. The cross section of each bundle of the module can be dimensioned to optimize uniform distribution of feed gas across the fiber bundle for a range of flow rates of feed mixture.

Generally hollow fiber membrane modules for gas separation made commercially have the following dimensions: diameter of module=1-20 inches, module length/diameter ratio=4-20, fiber outer diameter=20-1000 microns, fiber packing density=30-60%. The flow rate of the useful product and its recovery (product/feed ratio) depend upon the intrinsic permselective properties of the membrane and the operating conditions of the module (pressure, temperature, product purity, flow pattern).

EXAMPLE 1

This example provides suitable dimensions for a module to be used for nitrogen production from air based on the illustration in FIG. 2. The module contains polymeric hollow fibers of 400 microns outer diameter and 200 microns bore diameter and having the following permselective properties: $O_2$ permeance $\times -2.5 \times 10^{-5}$ scc/(cm$^2$·sec·cmHg) and $O_2/N_2$ selectivity=5.0. The fibers are uniformly packed with a packing density of 39%. The length of the fibers between tubesheets 27 and 28 is 6 feet. The outer diameter of the module (inner edge of sheath 22) is 6 inches. The diameter of the sheath 19 between the two stages is 3.87 inches. The diameter of the control conduit 12 is 1 inch. From the above dimensions it can be calculated that Stage 1 including fiber bundle 20 has a cross-sectional area of 16.5 square inches and a membrane area of 808 square feet, and Stage 2 including fiber bundle 18 has a cross-sectional area of 11 square inches and a membrane area of 539 square feet. Under operating conditions (feed pressure of 150 psia, permeate pressure of 15 psia) a computer simulation of the module performance shows that it can produce 433 scfh (standard cubic feet per hour, 60° F./1 atmosphere) of retentate containing 97.7% nitrogen. The feed rate of air to Stage 1 is 1200 scfh and the feed rate to Stage 2 (retentate from Stage 1) is 695 scfh. A calculation shows that the superficial velocities at the inlets of Stage 1 and Stage 2 are 73 scfh/in$^2$ and 63 scfh/in$^2$ respectively. The superficial velocity in Stage 2 is substantially similar to that in Stage 1.

Other embodiments and advantages of our invention will be apparent to those skilled in the art from the foregoing description without departing from the spirit or scope of our invention.

We claim:

1. A hollow fiber separation module comprising:
   (a) a pressurizable shell of generally cylindrical shape;
   (b) a mandrel positioned axially within said shell;
   (c) a first annular bundle of hollow fibers within a first volume of said shell and arranged along said mandrel, said fibers lying generally along paths running from one end of said bundle to the other end and formed from semipermeable membrane material capable of separating gases;
   (d) a first impermeable flexible sheath around said first fiber bundle;
   (e) a second annular bundle of hollow fibers within a second volume of said shell coaxial with said first bundle and arranged along said sheath, said fibers of said second bundle lying generally along paths running from one end of said second bundle to the other end and formed from semipermeable membrane material capable of separating gases.
   (f) a second impermeable sheath around said second fiber bundle and having passages therethrough adjacent said first tubesheet and into said second volume;
   (g) first and second tubesheets embedding first and second ends, respectively, of both said first and second fiber bundles and sealing the bores of the fibers of both bundles from the fiber exteriors between said tubesheets;
   (h) first conduit means associated with said mandrel with openings into said first volume adjacent said first tubesheet for introducing feed gas mixtures or withdrawing retentate and producing gas flow through said first volume;
   (i) second conduit means connected to said shell and communicating with said passages in said second sheath adjacent said first tubesheet for introducing feed gas mixtures or withdrawing retentate and producing gas flow through said second volume;
   (j) passage means through said first sheath adjacent said second tubesheet communicating said first and second volumes;
   (k) sealing means cooperating with said tubesheets for sealing the bores of the fibers of said first bundle from the bores of the fibers of said second bundle and defining discrete first and second zones communicating with the bores of said fibers which open through said tubesheets from said first and second bundles, respectively; and
   (l) means for withdrawing permeate separately from each of said first and second zones to produce permeate flow through the bores of the fibers countercurrent to the flow of gas through said volumes and produce first and second stage permeates.

2. The module of claim 1 wherein said first conduit means is connected to introduce feed gas, said second conduit means is connected to withdraw retentate, and said means for withdrawing permeate is connected to withdraw a first stage permeate from said first zone adjacent said first tubesheet and a second stage permeate from said second zone against said second tubesheet.

3. The module of claim 2 wherein said sealing means further define a third zone communicating with the bores of fibers of said first bundle opening through said second tubesheet and further comprising conduit means between said second and third zones for introducing second stage permeate as a sweep gas through the bores of the fibers of said first bundle.

4. The module of claim 3 further comprising means to recycle a portion of second stage permeate not used for sweep gas to the feed gas introducing means.

5. The module of claim 1 wherein said first conduit means is connected to withdraw retentate, said second conduit means is connected to introduce feed gas, and said means for withdrawing permeate is connected to withdraw a first stage permeate from said second zone adjacent said first tubesheet and a second stage permeate from said first zone adjacent said second tubesheet.

6. The module of claim 5 wherein said sealing means further define a third zone communicating with the bores of fibers of said second bundle opening through said second tubesheet and further comprising conduit means between first and third zones for introducing second stage permeate as a sweep gas through the bores of the fibers of said second bundle.

7. The module of claim 6 further comprising means to recycle a portion of second stage permeate not used for sweep gas to the feed gas introducing means.

8. The module of claim 1 further comprising means to recycle at least a portion of the second stage permeate to the feed gas introducing means.

9. The module of claim 1 comprised of fibers with different separation properties.

10. The module of claim 1 comprised of fibers with different diameters.

11. The module of claim 1 wherein the cross-sectional areas for the annular bundles are different in order to adjust the flow rates and concentrations of the high pressure retentate along the module.

* * * * *